US009037744B2

(12) United States Patent
Ishibashi

(10) Patent No.: US 9,037,744 B2
(45) Date of Patent: May 19, 2015

(54) INFORMATION PROCESSING APPARATUS, INFORMATION PROCESSING SYSTEM, MESSAGE CONTROL METHOD, AND PROGRAM PRODUCT, STORAGE MEDIUM

(75) Inventor: Yuki Ishibashi, Kawasaki (JP)

(73) Assignee: RICOH COMPANY, LTD., Tokyo (JP)

( * ) Notice: Subject to any disclaimer, the term of this patent is extended or adjusted under 35 U.S.C. 154(b) by 1707 days.

(21) Appl. No.: 11/477,672

(22) Filed: Jun. 30, 2006

(65) Prior Publication Data
US 2007/0005682 A1 Jan. 4, 2007

(30) Foreign Application Priority Data

Jun. 30, 2005 (JP) .................................. 2005-191091

(51) Int. Cl.
| G06F 15/16 | (2006.01) |
| G06F 21/00 | (2013.01) |
| G01R 31/08 | (2006.01) |
| G06F 9/54 | (2006.01) |
| G06F 15/177 | (2006.01) |

(52) U.S. Cl.
CPC .............. *G06F 9/545* (2013.01); *G06F 15/177* (2013.01); *G06F 9/541* (2013.01)

(58) Field of Classification Search
CPC ... H04L 45/306; H04L 45/02; H04L 67/2823; G06Q 10/06; G06F 15/177; G06F 15/173; G06F 9/455
USPC .............. 709/220, 217, 232; 713/172; 710/48
See application file for complete search history.

(56) References Cited

U.S. PATENT DOCUMENTS

| 4,058,838 | A | * | 11/1977 | Crager et al. ................. 358/425 |
| 5,228,080 | A | * | 7/1993 | Nutter et al. ............. 379/373.02 |
| 5,327,492 | A | * | 7/1994 | Parola ........................... 379/361 |
| 5,339,424 | A | * | 8/1994 | Fushimi ...................... 717/146 |
| 5,481,698 | A | * | 1/1996 | Itoh et al. ....................... 714/48 |
| 5,499,290 | A | * | 3/1996 | Koster .......................... 379/242 |
| 5,530,821 | A | * | 6/1996 | Miyamoto ................... 711/203 |
| 5,557,774 | A | * | 9/1996 | Shimabukuro et al. ........ 703/21 |
| 5,568,402 | A | * | 10/1996 | Gray et al. .................... 709/224 |
| 5,583,981 | A | * | 12/1996 | Pleyer ........................... 715/800 |
| 5,664,103 | A | * | 9/1997 | Stein et al. ................... 709/205 |
| 5,802,394 | A | * | 9/1998 | Baird et al. ...................... 710/5 |
| 5,991,856 | A | * | 11/1999 | Spilo et al. ................... 711/147 |
| 5,999,938 | A | * | 12/1999 | Bliss et al. ................... 707/102 |
| 6,222,529 | B1 | * | 4/2001 | Ouatu-Lascar et al. ...... 715/745 |
| 6,247,077 | B1 | * | 6/2001 | Muller et al. .................. 710/74 |
| 6,304,908 | B1 | * | 10/2001 | Kalajan ........................ 709/229 |
| 6,336,135 | B1 | * | 1/2002 | Niblett et al. ................ 709/215 |

(Continued)

FOREIGN PATENT DOCUMENTS

| JP | 2001-092677 | 4/2001 |
| JP | 2002-215420 | 8/2002 |
| JP | 2004-295321 | 10/2004 |

*Primary Examiner* — Krista Zele
*Assistant Examiner* — Margishi Desai
(74) *Attorney, Agent, or Firm* — Oblon, McClelland, Maier & Neustadt, L.L.P.

(57) ABSTRACT

An apparatus, method, system, computer program and product, which are capable of controlling an operating system message. The operating system message, generated by an operating system, is obtained. When a destination application, which has requested or may request for the operating system message is found, the operating system is converted to an application message readable to or executable by the destination application. The application message may be sent to the destination application.

6 Claims, 17 Drawing Sheets

(56) References Cited

U.S. PATENT DOCUMENTS

| | | | |
|---|---|---|---|
| 6,349,295 B1* | 2/2002 | Tedesco et al. | 1/1 |
| 6,424,718 B1* | 7/2002 | Holloway | 380/277 |
| 6,542,165 B1* | 4/2003 | Ohkado | 715/751 |
| 6,839,896 B2* | 1/2005 | Coffman et al. | 719/310 |
| 6,862,650 B1* | 3/2005 | Matthews et al. | 711/6 |
| 6,928,541 B2* | 8/2005 | Sekiguchi | 713/2 |
| 7,072,800 B1* | 7/2006 | Fernandez et al. | 702/186 |
| 7,084,760 B2* | 8/2006 | Himberger et al. | 340/540 |
| 7,246,193 B2* | 7/2007 | Rotvold et al. | 710/311 |
| 7,328,439 B1* | 2/2008 | Clark et al. | 719/318 |
| 7,512,965 B1* | 3/2009 | Amdur et al. | 726/1 |
| 7,539,631 B1* | 5/2009 | El-Haj | 705/26.1 |
| 7,606,867 B1* | 10/2009 | Singhal et al. | 709/209 |
| 7,730,138 B2* | 6/2010 | Ballinger et al. | 709/206 |
| 7,809,854 B2* | 10/2010 | Jung et al. | 709/238 |
| 8,458,467 B2* | 6/2013 | Dashora et al. | 713/167 |
| 2002/0026505 A1* | 2/2002 | Terry | 709/221 |
| 2002/0026605 A1* | 2/2002 | Terry | 714/37 |
| 2002/0099901 A1* | 7/2002 | Tanaka et al. | 711/6 |
| 2003/0001854 A1* | 1/2003 | Jade et al. | 345/581 |
| 2003/0037178 A1* | 2/2003 | Vessey et al. | 709/319 |
| 2003/0076366 A1* | 4/2003 | Skjolsvold | 345/855 |
| 2003/0225924 A1* | 12/2003 | Jung et al. | 709/313 |
| 2004/0024626 A1* | 2/2004 | Bruijning | 705/7 |
| 2004/0073738 A1* | 4/2004 | Kessler et al. | 710/308 |
| 2004/0078799 A1* | 4/2004 | Koning et al. | 719/313 |
| 2004/0205754 A1* | 10/2004 | Gazda et al. | 718/100 |
| 2004/0267911 A1* | 12/2004 | Alam | 709/220 |
| 2005/0066125 A1* | 3/2005 | Tanaka et al. | 711/114 |
| 2005/0070283 A1* | 3/2005 | Hashimoto et al. | 455/435.1 |
| 2005/0078660 A1* | 4/2005 | Wood | 370/352 |
| 2005/0091669 A1* | 4/2005 | Lamb et al. | 719/328 |
| 2005/0138230 A1* | 6/2005 | Raisch | 710/15 |
| 2005/0229257 A1* | 10/2005 | Kim et al. | 726/27 |
| 2005/0254518 A1* | 11/2005 | Fujimori | 370/466 |
| 2006/0015728 A1* | 1/2006 | Ballinger et al. | 713/172 |
| 2006/0041636 A1* | 2/2006 | Ballinger et al. | 709/218 |
| 2006/0168651 A1* | 7/2006 | Araki et al. | 726/6 |
| 2006/0293964 A1* | 12/2006 | Akihata | 705/26 |
| 2006/0294017 A1* | 12/2006 | Kim et al. | 705/59 |
| 2007/0005947 A1* | 1/2007 | Chartrand et al. | 713/1 |
| 2007/0061450 A1* | 3/2007 | Burnley et al. | 709/224 |
| 2008/0037578 A1* | 2/2008 | Carlson et al. | 370/463 |
| 2008/0066081 A1* | 3/2008 | Monnie et al. | 719/315 |
| 2008/0188221 A1* | 8/2008 | Hashimoto et al. | 455/435.1 |
| 2008/0318571 A1* | 12/2008 | Vikberg et al. | 455/435.2 |
| 2009/0170494 A1* | 7/2009 | Kim et al. | 455/418 |
| 2009/0213871 A1* | 8/2009 | Carlson et al. | 370/462 |

* cited by examiner

FIG. 8

| OS PROCESS ID | OSM | APPLM |
|---|---|---|
| PIDEN1 | LISTENING | DISPLAY " WAIT " |
| | ESTABLISHED | CALL FUNCTION ( ) |
| | SYN_SENT | CALL CLOSE ( ) |
| PIDEN2 | 8236 | DISPLAY " WAIT " |
| | 5152 | DISPLAY " WAIT " |
| | 4007 | CALL CLOSE ( ) |
| ⋮ | ⋮ | ⋮ |

FIG. 10

| WAITING PROCESS | OS PROCESS ID | SENDER ID |
|---|---|---|
| APPL-A | PIDEN1 | ABCD |
| APPL-B | PIDEN2 | EFGH |
| APPL-C | PIDEN1 | IJKL |
| ⋮ | ⋮ | ⋮ |

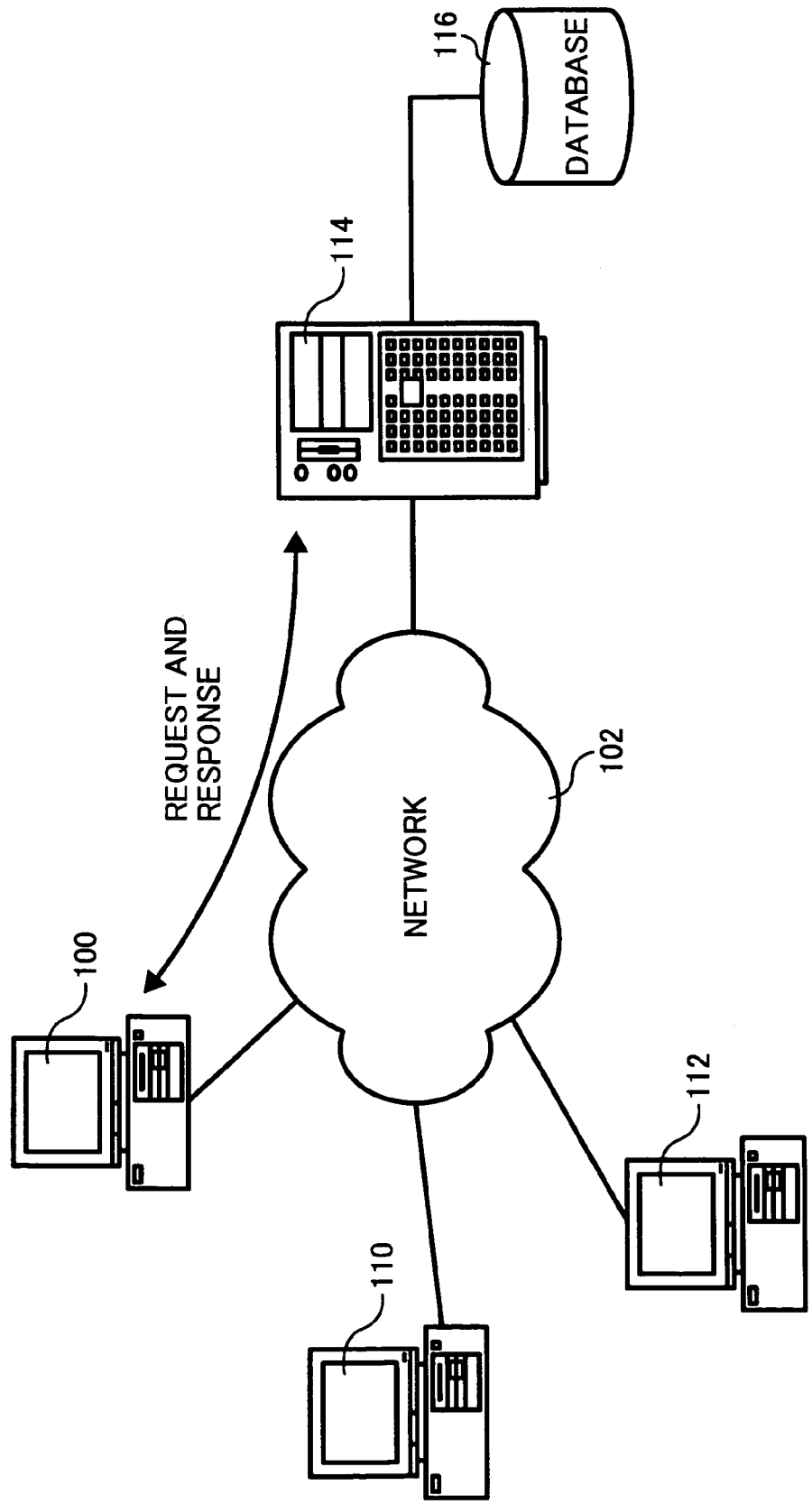

US 9,037,744 B2

INFORMATION PROCESSING APPARATUS, INFORMATION PROCESSING SYSTEM, MESSAGE CONTROL METHOD, AND PROGRAM PRODUCT, STORAGE MEDIUM

BACKGROUND

1. Field of Invention

Exemplary aspects of the present invention relate to an information processing apparatus, an information processing system, a message control method, and a program product, which are capable of effectively performing interprocess communication among a plurality of applications simultaneously running on an operating system.

2. Description of Related Art

In general, recent information processing apparatuses have been improved to allow installation of a plurality of applications at each individual apparatus. The plurality of applications installed on an information processing apparatus share various hardware resources under control of an operating system (OS). For example, the hardware resources include a memory, a hard disk, an input-output terminal, a display, and the like installed in or connected to the information processing apparatus. These information processing apparatuses are configured to provide a multitasking or multi-job environment in which a single application or a plurality of the same or different applications simultaneously run.

Such an improved performance of the information processing apparatuses and advanced programming languages have contributed to advances of a personal computer which is a most-popularly used information processing apparatus. In particular, a personal computer becomes capable of allowing the operating system and the applications to communicate with each other via interprocess communication in order to share data or to execute synchronization among the applications. For example, a message generated by the operating system ("the operating system message") under control of the operating system is usually received by applications running on the operating system or a remote device. However, an operating system message generated for a specific application may not be automatically or directly received by the applications other than the specific application ("the other applications").

To receive the operating system message for the specific application, in one example, one of the other applications may request the specific application or the operating system to send the operating system message for the specific application. However, the operating system message for the specific application may not be readable to or executable by the other application, since it has been generated for the specific application. In order to make the operating system message for the specific application readable or executable, a supplier of the other application needs to add an object for converting the operating system message into a code readable to or executable by the other application. Thus, the supplier of the other application may be required to modify an application program interface (API) for the other application every time an application is added.

In another example, more than one other applications may need the operating system message for the specific application. For example, when an operating system message is used by both a first other application and a second other application, and only the first other application requests the operating system for the operating system message for the specific application, the second other application cannot receive the operating system message, since the operating system message is addressed to the first application but not to the second application. Therefore, the second other application may also need to request the operating system for the same operating system message and to wait for a response from the operating system. This may increase the overall communication traffic and slow down the process.

One or more of the above-described or other problems may be explained referring to FIG. 1, which illustrates an exemplary software configuration of a related art information processing apparatus, in which a plurality of installed applications performs interprocess communication with an operating system.

As illustrated in FIG. 1, the information processing apparatus 1 includes an application layer 4, an operating system 3, and a BIOS (basic input output system) and/or device driver 2. The application layer 4 includes applications 4a, 4b, and 4c.

The application 4a directly communicates with the operating system 3 via interprocess communication. For example, the application 4a sends or receives a result of communication with a storage or a communication device controlled by the BIOS and/or device driver 2. In this example, the applications 4b and 4c are not configured to automatically or directly communicate with the operating system 3. Therefore, the application 4b or 4c does not automatically or directly receive an operating system message, which is generated by the operating system 42 for the application 4a. The application 4b or 4c may request the operating system 3 or the application 4a to send the operating system message for the application 4a. However, in one example, the operating system message may not be readable to or executable by the application 4b or 4c. The application 4b or 4c cannot notify a user of the current status of the process, and may cause the use to wait for a certain time period. In another example, the applications 4b and 4c may both request for the same operating system message, thus requiring the user to wait for a certain time period. During the waiting time period, the user is not able to determine whether the process performed by the information processing apparatus 10 hangs up or is waiting to be performed. As a result, the user may choose to restart the information processing apparatus 1, knowing that data that has been created may not be recovered.

SUMMARY

An apparatus, method, system, computer program and product, which are capable of controlling an operating system message. The operating system message, generated by an operating system, is obtained. When a destination application, which has requested or may request for the operating system message is found, the operating system is converted to an application message readable to or executable by the destination application. The application message may be sent to the destination application.

BRIEF DESCRIPTION OF THE DRAWINGS

A more complete appreciation of the invention and the many attendant advantages thereof will be readily obtained as the same becomes better understood by reference to the following detailed description when considered in connection with the accompanying drawings, wherein:

FIG. 8 illustrates a conversion table looked up by an entry controller in the software configuration shown in FIG. 4;

FIG. 10 illustrates an entry table of a destination-message storage in the software configuration shown in FIG. 4;

FIG. 17 illustrates information processing apparatuses including a message handler in the software configuration shown in FIG. 4 according to another exemplary embodiment of the present invention.

DETAILED DESCRIPTION OF EXEMPLARY EMBODIMENTS

Figure 1:
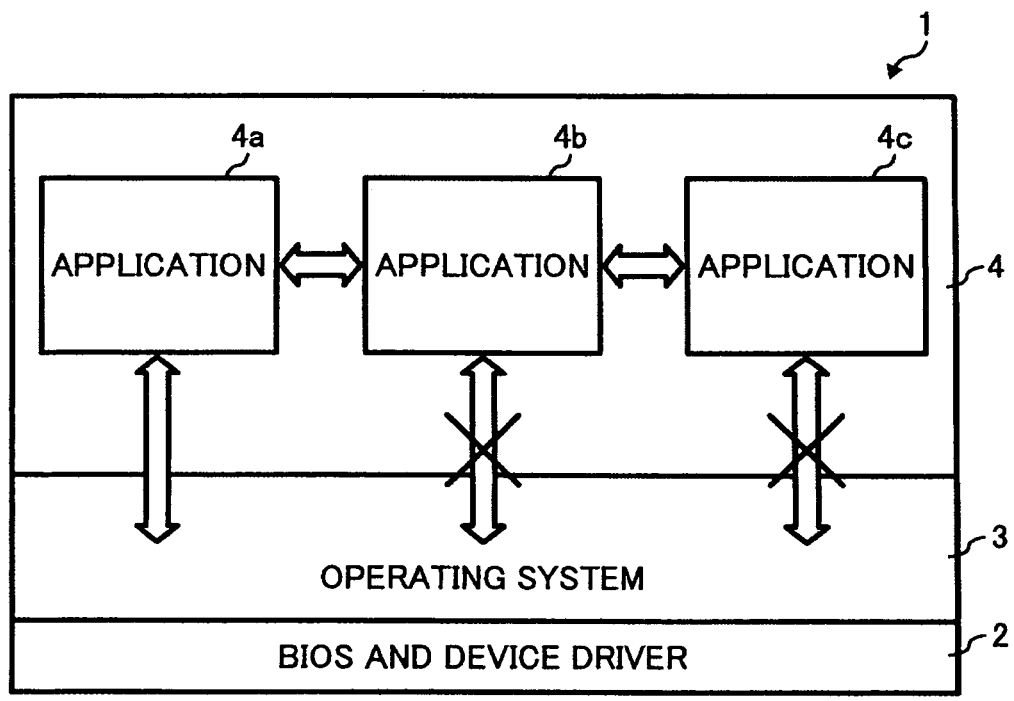
FIG. 1 illustrates a software configuration of a related art information processing apparatus.

In describing exemplary embodiments illustrated in the drawings, specific terminology is employed for the sake of clarity. However, the disclosure of this specification is not intended to be limited to the specific terminology so selected and it is to be understood that each specific element includes all technical equivalents that operate in a similar manner.

Figure 2:
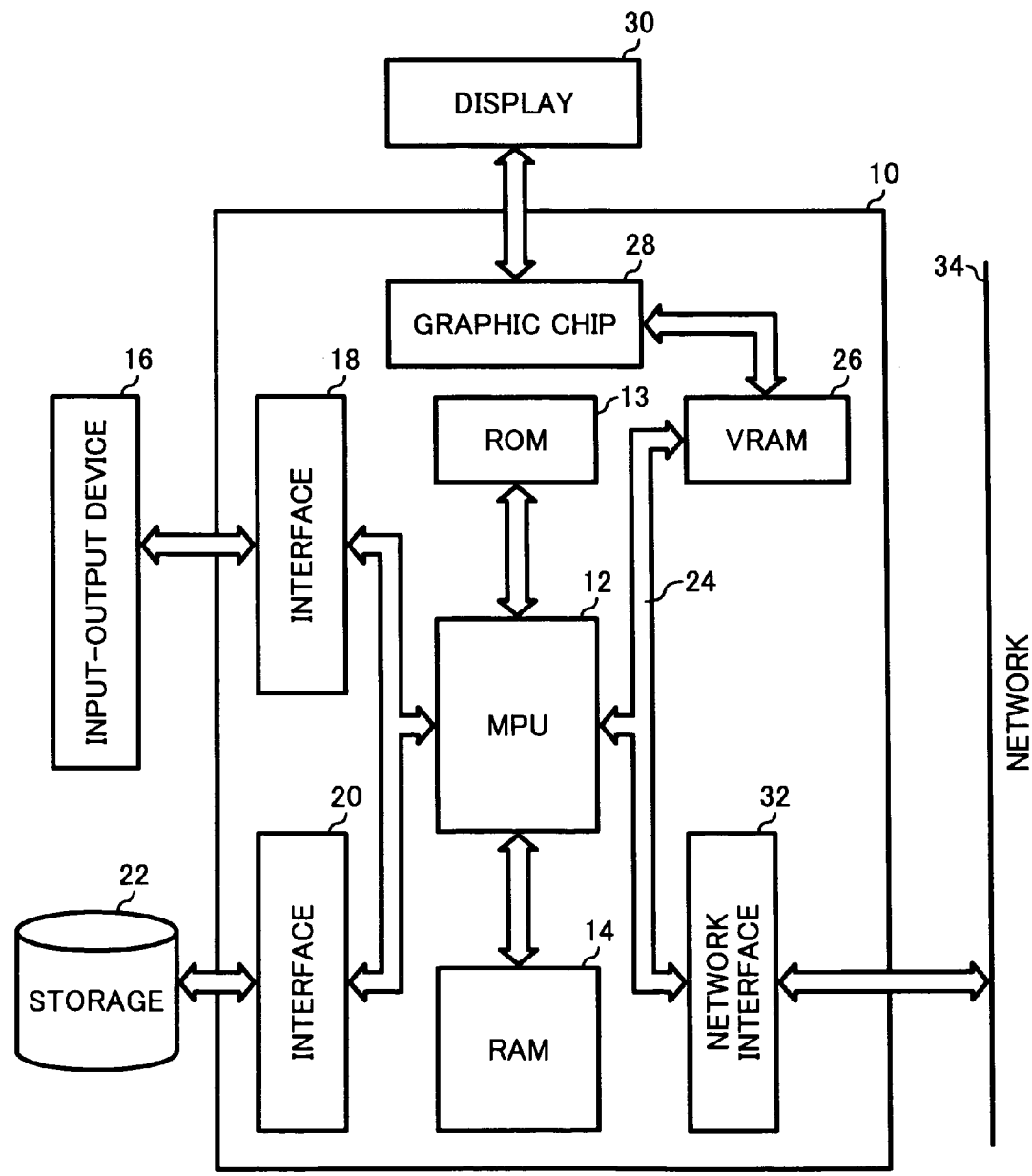
FIG. 2 illustrates a hardware configuration of an information processing apparatus according to an exemplary embodiment of the present invention.

Referring now to the drawings, wherein like reference numerals designate identical or corresponding parts throughout the several views, particularly to FIG. 2, an information processing apparatus 10 according to an exemplary embodiment of the present invention is explained.

As illustrated in FIG. 2, the information processing apparatus 10 includes an MPU (microprocessor unit) 12, a ROM (read-only memory) 13, a RAM (random access memory) 14, interfaces 18 and 20, an internal bus 24, a VRAM (video random access memory) 26, a graphic chip 28, and a network interface 32. The information processing apparatus 10 is connected to an input-output device 16, a storage 22, a display 30, and a network 34.

In the information processing apparatus 10, a plurality of applications is executed under control of an operating system. The MPU 12 may be implemented by any kind of processor capable of executing the operating system, for example, a PENTIUM® family processor, XEON® family processor, CISC (complex instruction set computer) processor, or RISC (reduced instruction set computer) processor including POW-ERPC®. The examples of the operating system include, but not limited to, Windows®, Windows® 2000, Windows® 2000 Professional, Windows® XP, Windows® XP SP2, Windows® XP Professional, Windows® 2000 Server, and Windows® CE.

The MPU 12 may execute an object-oriented program (e.g., C++, Java®, Java® Beans, Java® Applet, Java® Script, and Perl) by using various resources. The operating system manages processes of the object-oriented program by using various system calls or commands, or allows the processes to share hardware resources or data.

The RAM 14 provides a work area for the MPU 12 for processing an instance generated upon the execution of the program. The ROM 13 may store a microcode, such as a BIOS (basic input output system), or data. The ROM 13 may be used to check the status of the information processing apparatus 10 before starting the operating system. The ROM 13 may be used to manage operation of the input-output device 16 after the operating system is started.

The input-output device 16 may include, for example, a keyboard, a mouse, or a printer. The input-output device 16 is connected to the information processing apparatus 10 via a serial or parallel bus such as a USB (universal serial bus) or an IEEE (Institute of Electrical and Electronics Engineers) 1284. Data input by a user through the input-output device 16 is sent to the MPU 12 via the interface 18. The interface 20 includes an IDE (intelligent drive electronics) conforming to the standard including an ATA (advanced technology attachment), a Serial ATA, an Ultra ATA, and an ATAPI (AT attachment packet interface), a SCSI (small computer system interface), a SCSI-2, or a SCSI-3. The storage 22 is connected to the MPU 12 of the information processing apparatus 10 via the interface 20. The storage 22 may include a hard disk drive including a card type hard disk, or a semiconductor memory including a rewritable or redable semiconductor memory. The storage device 22 may be provided separately from the information processing apparatus 10, or it may be provided in the information processing apparatus 10.

The MPU 12 reads and executes an executable program in accordance with a command input by the user, and writes data such as the execution result into the RAM 14 or the storage 22 via the internal bus 24. The MPU 12 reads the data, which may be stored in the storage 22, to perform various processing to generate the processing result. The MPU 12 sends data, such as the processing result, to the VRAM 26 and the graphic chip 28 via the internal bus 24, and displays the result on the display 30 via a GUI (graphical user interface). The MPU 12 is connected to the network interface 32 through the internal bus 24. The network interface 32, which may be in compliance with the Ethernet®, allows the MPU 12 to communicate with another apparatus, for example, a web server, through the network 34. The network 34 may include a LAN (local area network), a WAN (wide area network), or the Internet.

Figure 3:
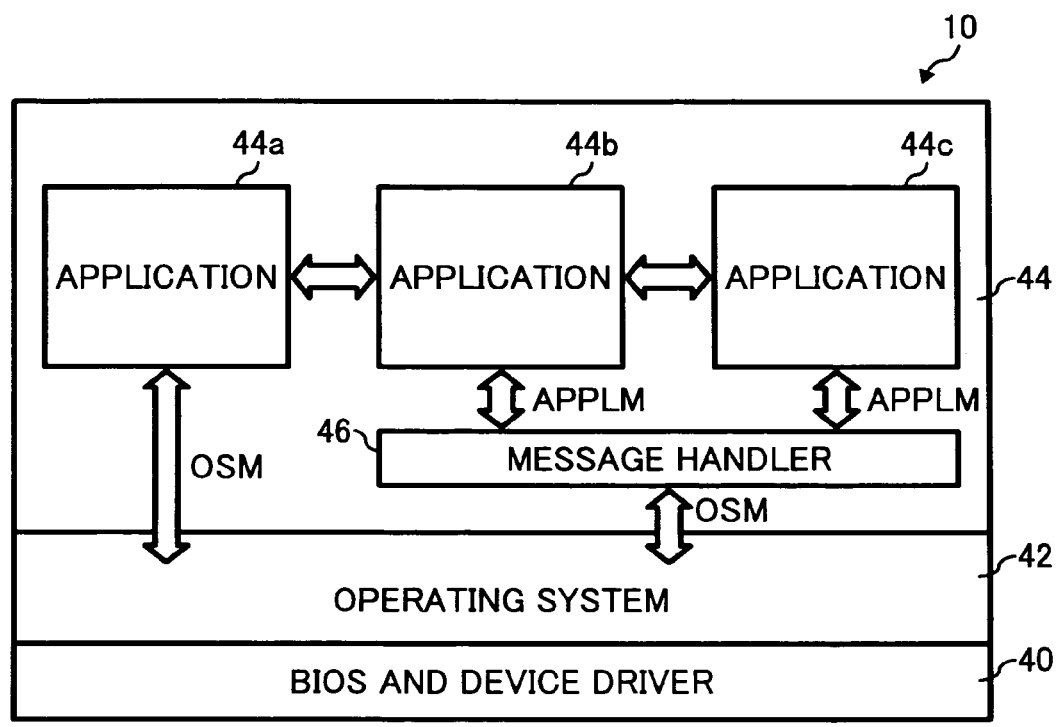
FIG. 3 illustrates a software configuration of the information processing apparatus shown in FIG. 2.

FIG. 3 illustrates an exemplary software configuration of the information processing apparatus 10 shown in FIG. 2.

Figure 4:
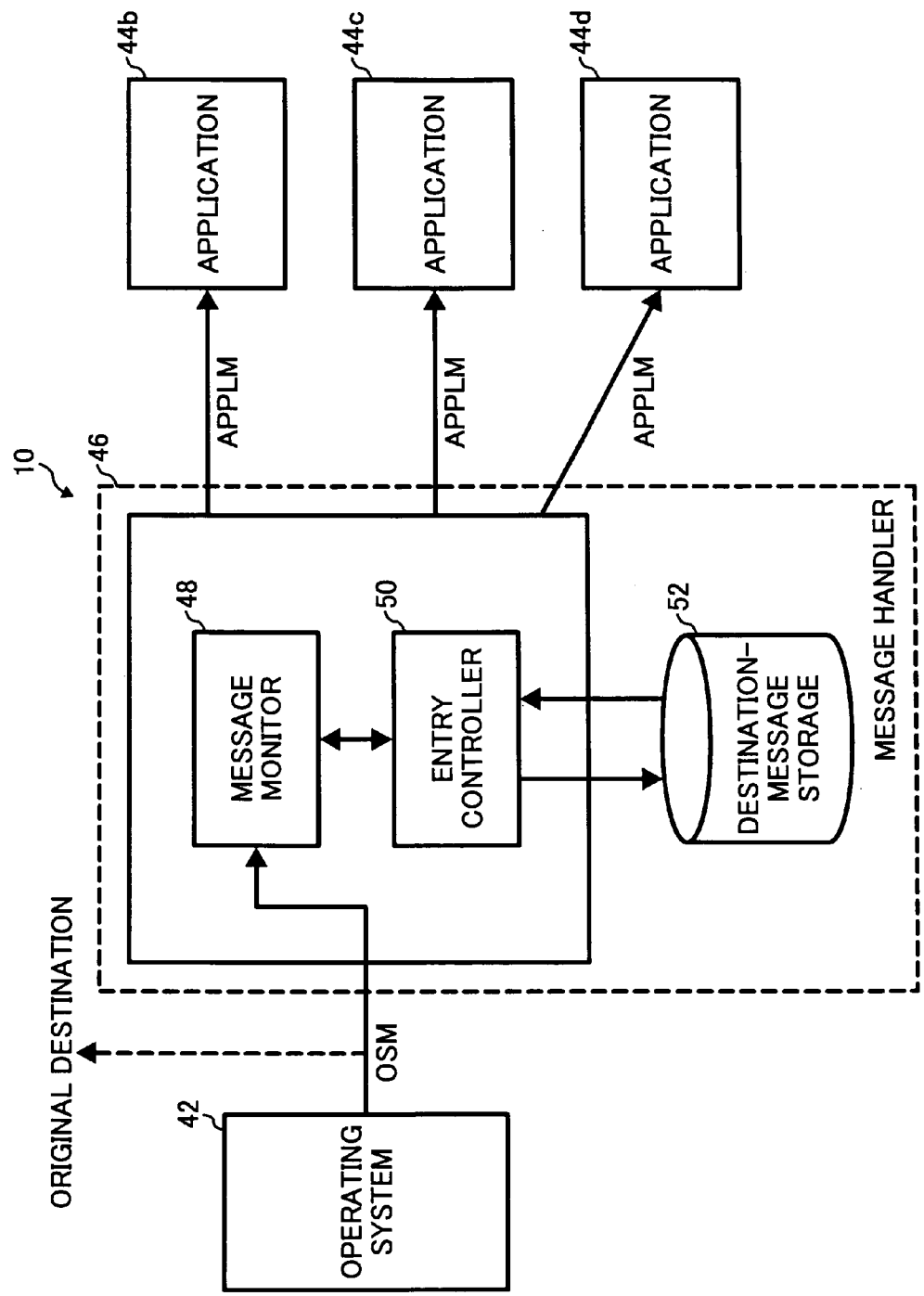
FIG. 4 is a functional block diagram of the software configuration shown in FIG. 3.

As illustrated in FIG. 3, the information processing apparatus 10 includes an application layer 44, an operating system 42, a BIOS and/or device driver 40, and a message handler 46. The application layer 44 includes a plurality of applications 44a, 44b, and 44c. The application layer 44 may also include an application 44d as illustrated in FIG. 4.

The application 44a directly communicates with the operating system 42 via interprocess communication. For example, the application 44a sends or receives a result of communication with a storage or a communication device, which is controlled by the BIOS and/or device driver 40. In another example, the application 44a sends or receives a processing result of the operating system 42. The applications 44b and 44c communicate with the operating system 42 via the message handler 46.

In this example, the applications 44b and 44c are not capable of directly communicating with the operating system 42. Examples of the application 44b or 44c include, but not limited to, a word-processing application, a spreadsheet application, a database application, and a document management application. Referring to FIG. 3, the message handler 46 is provided between the applications 44b and 44c and the operating system 42. The message handler 46 monitors interprocess communication performed by the operating system 42, and obtains an operating system message ("OSM" in FIG. 3) generated for the application 44a without blocking interprocess communication. The message handler 46 further obtains information regarding an application which may perform a process related to the operating system message or an application which has requested for the process related to the operating system message, as information regarding a destination application. The message handler 46 checks whether the destination application has been already installed in the apparatus 10, for example, by referring to an entry table managed by the message handler 46. For example, if the application 44b corresponds to the destination application for the obtained operating system message, the message handler 46 checks whether the application 44b has been registered in the entry table.

When it is determined that the application 44b has been registered, the message handler 46 converts the operating system message into an application message ("APPLM" in FIG. 3), to make the message readable to the application 44b. Using the destination information regarding the application 44b, the message handler 46 transmits the application message to the application 44b. In this example, the destination information regarding the application 44b may include, for example, any kind of information that may be used to identify the application 44b, such as a port number or an application name, which may be obtained from the entry table. In this example, the operating system message may be transmitted to more than one destination application in an order set by default or according to user preference. In this manner, the application 44b or 44c receives the application message in the format readable to or executable by the application 44b or 44c. Thus, each of the applications 44b and 44c may be able to perform a process corresponding to the operating system message without directly communicating with the operating system 42. For example, each of the applications 44b and 44c may notify the user of the status of each of the applications 44b and 44c and may perform the process corresponding to the status of each of the applications 44b and 44c (e.g., data back-up processing).

FIG. 4 is a functional block diagram of the software configuration of the information processing apparatus 10 shown in FIG. 3. As illustrated in FIG. 4, the information processing apparatus 10 includes the application 44d. In this example, the message handler 46 includes a message monitor 48, an entry controller 50, and a destination-message storage 52. The message monitor 48 includes an object for monitoring an operation system message without blocking communication between the operating system 42 and an addressed destination such as the application 44a. The object for monitoring, which may have the function of listening or scanning, may be implemented in various ways. In one example, the message handler 42 may obtain an operating system message (i.e., "OSM" in FIG. 4) issued by the operating system 42, which is addressed to the original destination ("the passive mode"). Alternatively, the message handler 46 may cause the operating system 42 to actively generate an operating system message in a manner that the message handler 46 becomes the original destination ("the active mode").

In the passive mode, an object may be created as a socket in a promiscuous mode to monitor all interprocess communications performed by the operating system 42. The examples of such object include an object for using a raw socket, which may be implemented as a non-closed code while the message monitor 48 operates.

In the active mode, the message handler 46 may cause the operating system 42 to generate an operating system message, using a return value obtained in response to a system command. The system command may include "netstat-x", which detects the status of interprocess communication performed by the operating system 42 with the "-x" being the option. Alternatively, the message monitor 48 may be implemented by an object including a "netstat" command, which collects information regarding the status of a well-known or registered port assigned to the operating system 42. In the active mode, the message generated in response to the "netstat-x" command is addressed to the message handler 46. Therefore, interprocess communication with the original destination may not be blocked.

The option "-x" includes, for example, "-a", "-b", "-e", "-n", "-p", "-r", "-s", "-o", and "-v". When the "-a" option is used, the operating system 42 generates a return value indicating the status of a standby process. To cause the message monitor 48 to periodically monitor interprocess communication of the operating system 42, for example, the option "netstat-a 1" may be used, which periodically (e.g., every second) returns the status of interprocess communication after the message monitor 48 is started. An interval for periodic monitoring may be set by default or according to user preference.

The message monitor 48 in this example is capable of monitoring the operating system message even when the operating system message is addressed to the original destination. In one example, the message monitor 48 collects the operating system message issued by the operating system 42, and stores information regarding the operating system message in a queue. In another example, the message monitor 48 monitors the status of interprocess communication by using the system command, and registers the return value of the system command in a queue ( ), which functions as the queue. The queue may be stored in a storage, such as the RAM 14.

The destination-message storage 52 may include an entry table storing information regarding the destination application, i.e., the application which may request the operating system message stored in the queue or which has requested the operating system message stored in the queue. The entry controller 50 requests the destination-message storage 52 to search through the entry table for the destination application. If the destination application for the operating system message is found, the entry controller 50 obtains destination application information, such as the address of the destination application, and accesses a conversion table to obtain an application message "applm" for the destination application. The entry controller 50 sends the message monitor 48 a notification message containing the obtained address and the application message "applm" in an argument. In this example, the application message may be obtained in the form of an executable code.

When the message monitor 48 receives the notification message, the message monitor 48 encapsulates the address and the code "applm" into a packet, for example, by using a "socket ( )" command or a command compatible with the "socket ( )" command (e.g., "winsock" or "winsock2"). The message monitor 48 sends the encapsulated packet to the destination application, such as the application 44b, 44c, or 44d using a TCP/IP (transmission control protocol/Internet protocol) or a UDP-IP (user datagram protocol/Internet protocol).

One or more of the above-described functions of the entry controller 50, such as the function of searching for the destination application or the function of converting the message, may not be performed by the entry controller 50. For example, one or more of the functions of the entry controller 50 may be performed by the message monitor 48 or the destination-message storage 52.

Figure 5:
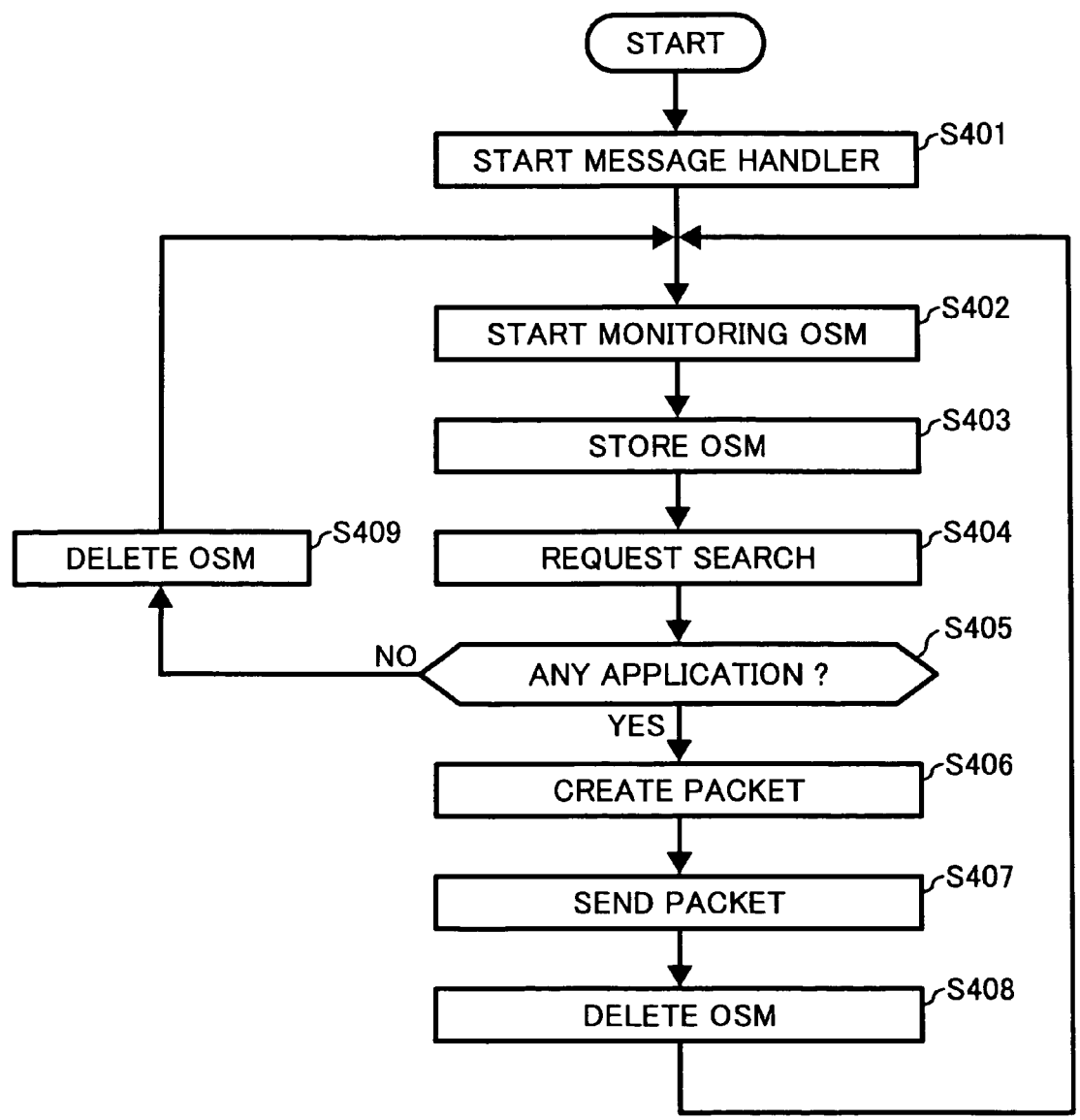
FIG. 5 is a flowchart illustrating operation of a message monitor shown in FIG. 4.

FIG. 5 is a flowchart illustrating operation performed by the message monitor 48, upon execution of the message handler 46. According to this non-limiting exemplary embodiment of the present invention, the message handler 46 may be configured as a service residing in a system memory or daemon software. In one example, the message handler 46 may start processing as soon as the operating system 42 is started. Alternatively, the message handler 46 may be started after a predetermined time period counted from the timing when the operating system 42 is started in order to avoid heavy traffic of interprocess communication which may occur immediately after the operating system 42 is started. According to another non-limiting exemplary embodiment of the present invention, the message monitor 48 may start processing in response to an input command (e.g., clicking an icon by the user).

As illustrated in FIG. 5, in step S401, the message handler 46 is started, for example, in response to the execution of the operating system 42 or a command input by the user. In step S402, the message monitor 48 starts monitoring an operating system message. In step S403, an operating system message is stored in the queue every time the operating system message is generated.

When the operating system message is stored in step S403, or when the queue ( ) entry indicates "null", the message monitor 48 requests the entry controller 50 to search for a destination application in step S404, for example, by sending a "get_query" message. In step S405, the message monitor 48 determines whether a notification message indicating the destination application is received from the entry controller 50. If no notification message is received (i.e., if "NO" is selected in step S405), the message monitor 48 deletes the operating system message from the queue in step S409 and returns to step S402 to wait for a next operating system message.

If the notification message is received in step S405 (i.e., if "YES" is selected in step S405), the message monitor 48 obtains the address of the destination application and the code executable by the destination application, from the notification message. In step S406, the message monitor 48 creates a packet containing the address and the code of the destination application by using the "socket ( )" command or the command compatible with the "socket ( )" command (e.g., "winsock" or "winsock2"). In step S407, the message monitor 48 sends the packet to the destination application, for example, by using a socket programming technique based on Java®. When the packet is sent, the message monitor 48 deletes the operating system message from the queue in step S408, and the operation returns to step S402.

When using the socket programming, a socket may be defined with a 32-bit address (e.g., an IP address corresponding to the information processing apparatus 10) and a port number of the destination application. The application message (i.e., "applm") to be sent to the destination application is obtained as a byte code in data to be sent (e.g., OutputStream class). After establishing connection with the socket, the application message, that is, the code executable by the destination application, is written to the port of message monitor 48 through the socket. The code closes the socket to complete the processing. Once the "applmsend" message is received from the entry controller 50, the message monitor 48 obtains the executable code and the address (e.g., the port number assigned to the destination application) of the destination application as a character string or a byte code. The socket is closed after completing the process for obtaining the "applmsend" message.

The "applmsend" message may have a fixed length or a variable length. The message monitor 48 analyzes the value in an "applmRcvdbuffer" buffer storing the message, obtains the application message and the address, and sends the application message to the destination application by using the code, which established the socket connection.

Figure 6:
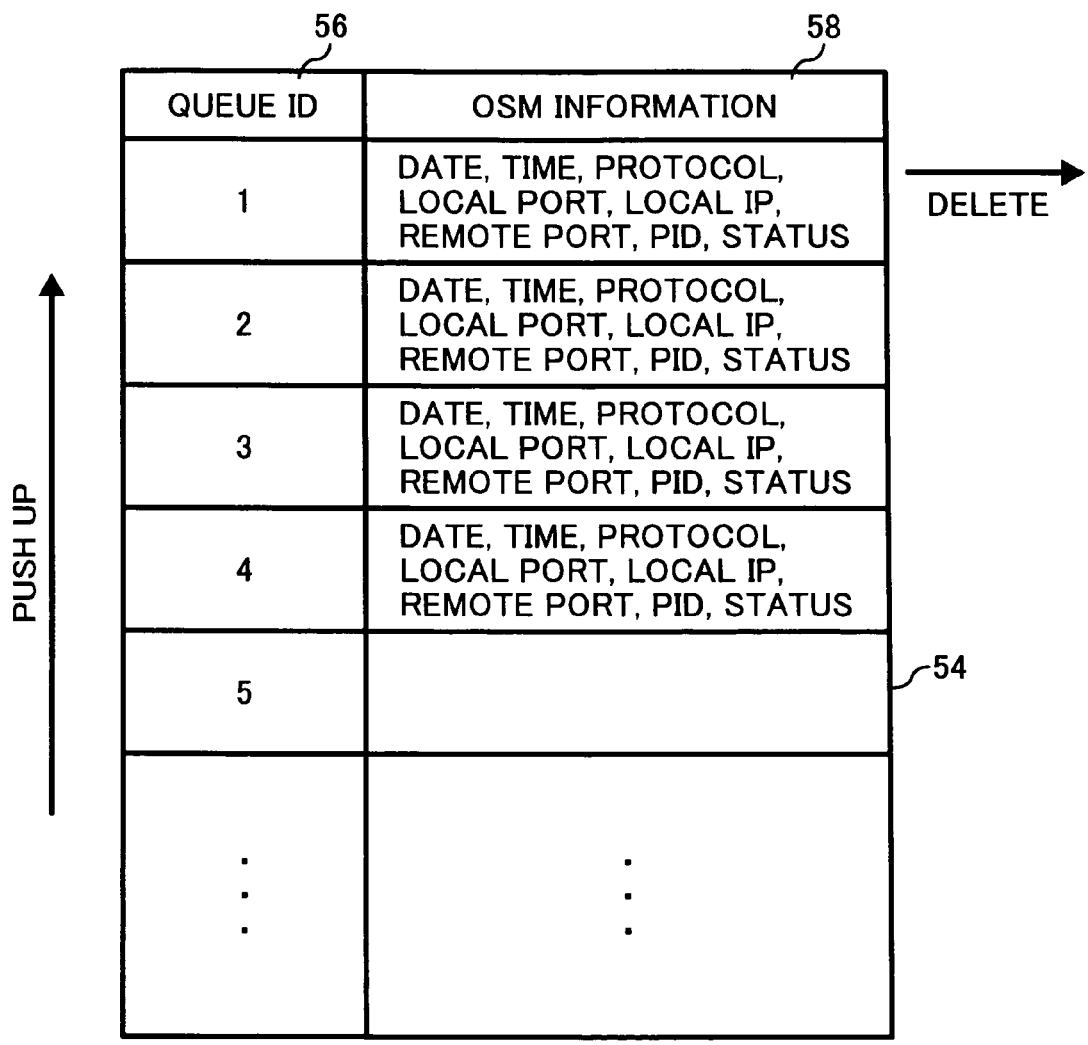
FIG. 6 illustrates a queue list created in the operations shown in FIG. 5.

FIG. 6 illustrates a queue list 54, which may be created in step S403 shown in FIG. 5. As illustrated in FIG. 6, the queue list 54 includes fields 56 and 58. The field 56 contains a queue ID indicating an order of entry. The field 58 contains information included in an operating system message. For example, the field 58 contains information indicating date and time when the operating system message is issued, a protocol, an operating system process identification number ("OS process ID" or "PIDEN") such as a local port number, a local IP address which is selected from a local loopback address (e.g., 0.0.0.0 and 127.0.0.1) and IP address of the information processing apparatus 10, a remote or destination port number, a PID (port identifier), or a status.

Additionally or alternatively, the message monitor 48 may obtain an executable file name from the operating system 42. The file name may be stored in the queue list 54 for later use, for example, when searching or converting.

The operating system messages registered in the queue list 54 are processed in a sequential order from the operating system message having the smallest queue ID. When the operating system message listed in the queue list 54 is processed or when no destination application is found, the operating system message is deleted so that a new operating system message may be registered. In this manner, the number of the operating system messages stored in the queue list 45 can be reduced, thus improving search efficiency.

Figure 7:
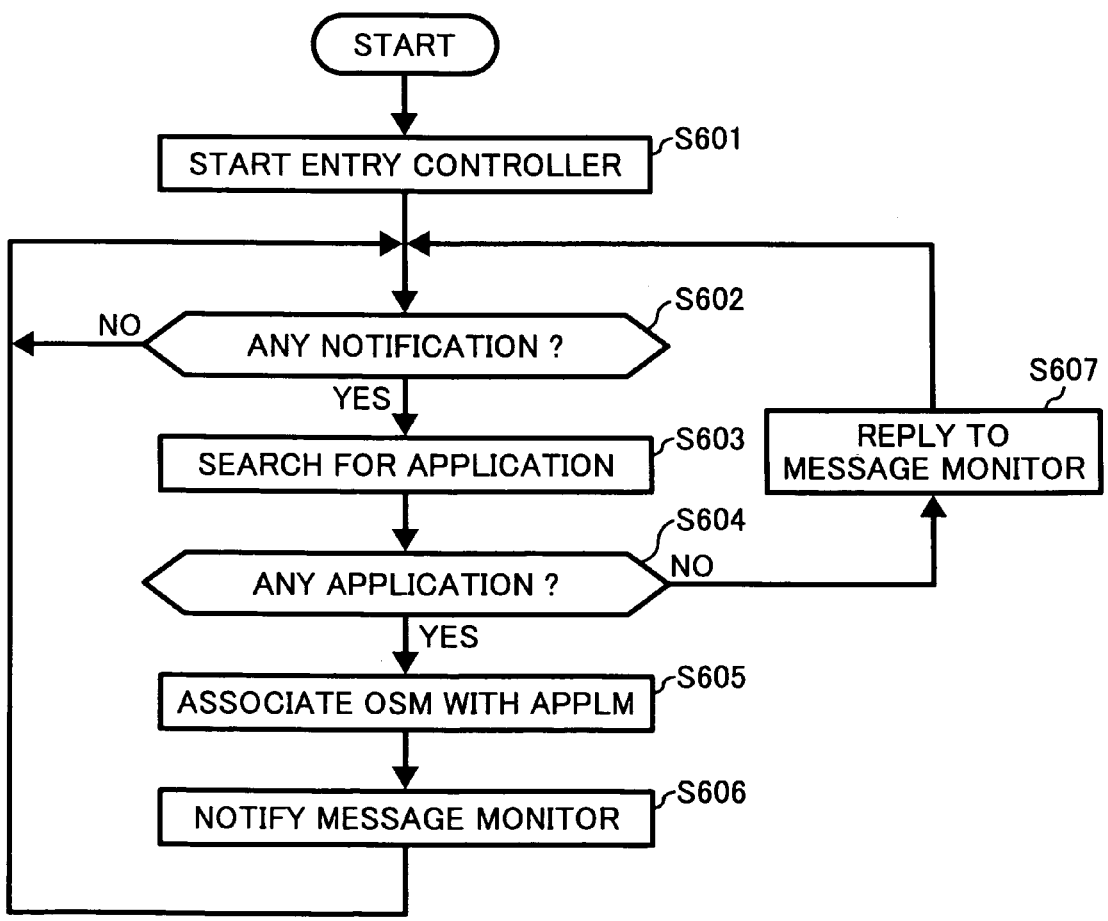
FIG. 7 is a flowchart illustrating operations of an entry controller in the software configuration shown in FIG. 4.

FIG. 7 is a flowchart illustrating operation performed by the entry controller 50, upon execution of the message handler 46. As illustrated in FIG. 7, the entry controller 50 is started, for example, in response to the execution of the operating system 42 or the message handler 46 in step S601. In step S602, the entry controller 50 determines whether any request is received from the message monitor 48. If a message requesting search such as the "get_query" message is not received from the message monitor 48 in step S602 (i.e., if "NO" is selected in step S602), the entry controller 50 repeats step S602.

If the entry controller 50 receives the request such as the "get_query" message (i.e., if "YES" is selected in step S602), the entry controller 50 searches the destination-message storage 52 for the destination application in step S603. In step S604, the entry controller 50 determines whether the destination application is stored in the destination-message storage 52 based on the search result obtained in step S603, such as the return value. If the search result indicates that no destination application is found (i.e., if "NO" is selected in step S604), the entry controller 50 replies to the message monitor 48 that no destination application is found in step S607. The entry controller 50 then returns to step S602 to wait for a next "get_query" message.

If it is determine that the destination application is found (i.e., if "YES" is selected in step S604), the entry controller 50 looks up the conversion table to associate the operating system message obtained from the "get_query" message with a code executable by the destination application (i.e., an application message) in step S605. In step S606, the entry controller 50 sends the notification message to the message monitor 48, which contains the code executable by the destination application and the address of the destination application. The notification may be performed through interprocess communication. For example, as described above referring to FIG. 5, the entry controller 50 may create an "applmsend" socket, and send the executable code and the address of the destination application as the byte code to the message monitor 48.

FIG. 8 illustrates a conversion table 60, which is used by the entry controller 50 in step S605 shown in FIG. 7. As illustrated in FIG. 8, the conversion table 60 includes fields 62, 64, and 66. The field 62 contains the OS process ID, or the PIDEN. The field 64 contains a status of the operating systems message, which corresponds to the OS process ID (i.e., the "OSM"). The field 66 contains the code executable by the application (i.e., the "APPLM"), which corresponds to the status of the operating system message. For example, "PIDEN1" may indicate the port number or the executable file name of a process for managing an external storage (e.g., the storage 22). The corresponding operating system message may include information regarding the addressed process when the message handler 46 operates in the passive mode, for example, by using the promiscuous mode socket. Alternatively, when the message handler 46 operates in the active mode, for example, by using the "netstat" command, the corresponding operating system message may include "closed", "listening", "syn_sent", "syn_received", "established", "fin_wait_1", "fin_wait_2", or "last_ack". However, the corresponding operating system message may contain information other than the above-described examples.

For example, instead of indicating the status of the process, the operating system message may include the value of the execution command, as shown in the case of "Piden2" in FIG. 8. Any other kind of OSM information may be used as long as it can indicate the status of the operating system 42 relating to the application.

As described above, the conversion table 60 may be used to convert the status of the operating system message to the application message. For example, when the operating system message status corresponding to "Piden1" is "established", "listening", "syn_sent", or "last_ack", a response to the operating system message may not be generated, since the port has been taken by the other application or process or it may be in the functional failure. To make such information readable to the application, the code executable by the application listed in the field 66 is obtained.

For example, when the status of the operating system message is "listening", the 'display "wait", which indicates that the application is waiting may be obtained. When the status of the operating system message is "established" indicating that interprocess communication is established for the other process, the "call function ( )", which allows the other process to proceed, may be obtained.

When the status of the operating system message is "syn_sent", the process communicating with the operating system 42 may be waiting for a response regarding a message sent to the operating system 42. Therefore, how long the process takes may not be predictable or the process or the device performing the process may be unavailable for use. The "call close ( )" command, which interrupts or ends the process, may be obtained. Alternatively, in this example, when the application performs the same processing for any status of the operating system process, the status of the operating system message may not need to obtained or stored in the conversion table 60. In such case, the application message may be obtained from the OS process ID.

Figure 9:
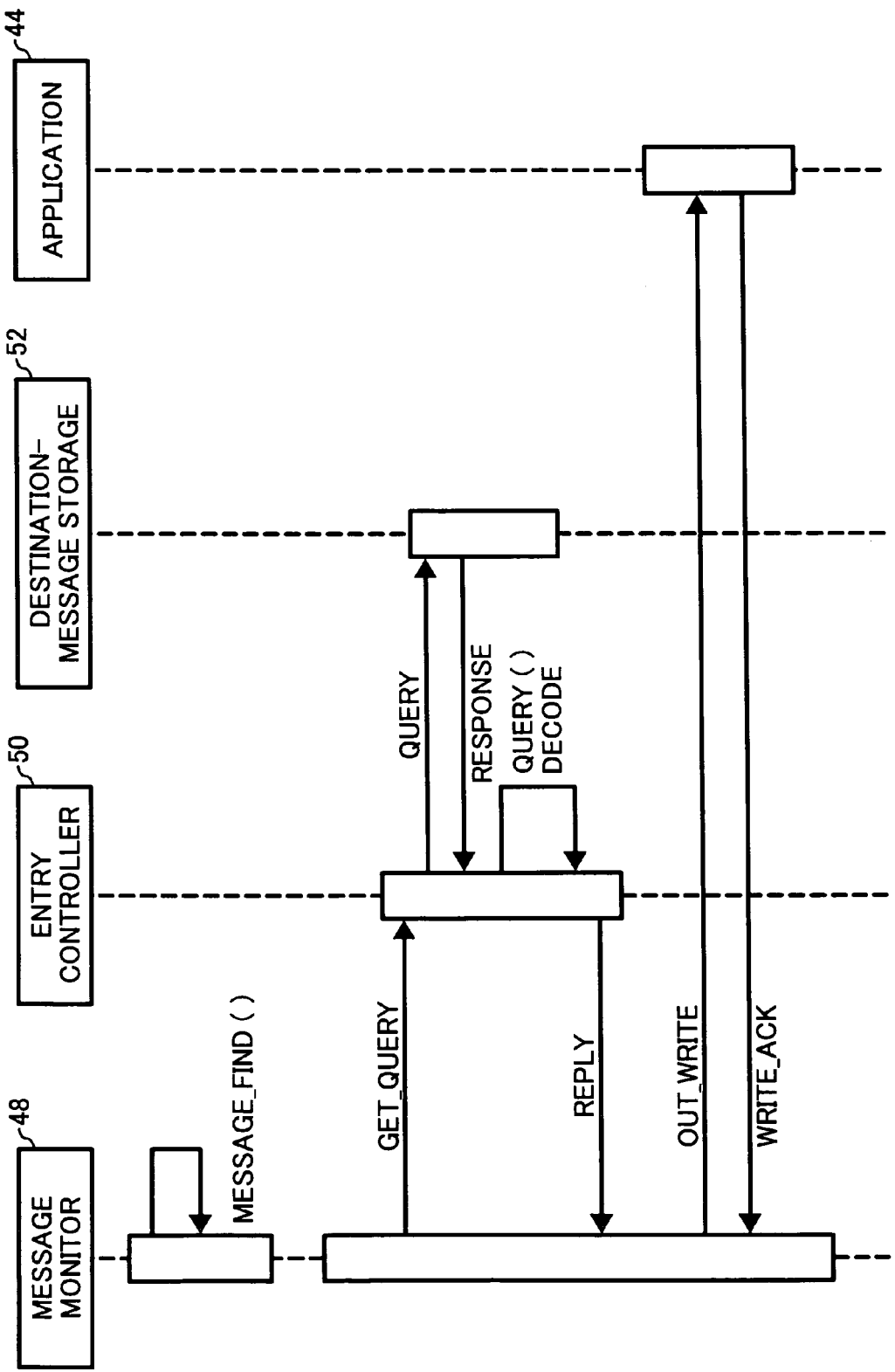
FIG. 9 illustrates processing of a message handler in the software configuration shown in FIG. 4.

In another example, operation of the message handler 46 may be performed by an instance of an object based on a UML (unified modeling language) as illustrated in FIG. 9. The message monitor object generates an instance upon execution of the operating system 42, which periodically monitors and obtains an operating system message or obtains the operating system message when it is generated. Whenever the operating system message is obtained, the message monitor object adds the operating system message to the queue list 54. An instance for a message distribution object corresponding to the operating system message stored in the queue list 54 is generated to send a request message for searching or retrieving to the entry controller 50.

When the request message is received, an entry control object generates an instance of a search object. The entry control object accesses the destination-message storage 52 to perform message conversion, and then sends the conversion result to the message distribution instance. The message distribution instance obtains the application message and the address from the received conversion result to define a new socket, and then sends the socket to a destination application. The message distribution instance ends when the message distribution instance receives, from the destination application, a reception notification (i.e., "close_ack") described in a format set by the destination application. Alternatively, the message distribution instance may end when the message distribution instance finishes sending a packet, without waiting for the reception notification from the destination application.

In another example, when the search object receives a message from the message distribution instance, the search object may generate an instance of a decoding object to perform decoding. The entry table stores system and application codes which may need to be protected against unauthorized access. The entry controller 50 includes encoding and decoding objects for performing encoding and decoding. The encoding object may encode and store selected or whole data in the entry table. The instance of the decoding object may be generated as needed to perform search by decoding the data in the entry table.

FIG. 10 illustrates an entry table 70 of the destination-message storage 52 shown in FIG. 4. As illustrated in FIG. 10, the entry table 70 includes fields 72, 74, and 76. The entry table 70 is stored in a storage, such as the memory or the hard disk drive, managed by the entry controller 50. When an application requests an operating system message, the application is dynamically registered in the entry table 70, using any kind of registering method. In this example, the application waits for the operating system message after performing some processing. Therefore, the application is registered in a queue list and is deleted from the queue list on a first-in-first-out basis.

The field 72 contains an application process waiting for an operating system message (i.e., a waiting process). The field 74 contains the OS process ID requested by the waiting process. The field 76 contains sender identification information (i.e., a sender ID) including the port number of the waiting process, for example. The OS process ID and the sender identification information are stored in a corresponding manner.

When the entry controller 50 is accessed by the message distribution instance of the message monitor 48, the entry controller 50 performs message conversion on the waiting process in an order from the waiting process entered first to last. The entry controller 50 stores the conversion result together with the sender identification information in a buffer such as an "applmBuffer". When the entry controller 50 finishes application message conversion for all waiting processes, the entry controller 50 encapsulates information in the "applmBuffer", which stores the conversion result, as data and sends the data to the message distribution instance. The entry controller 50 deletes the entry of the waiting process to complete process.

Figure 11:
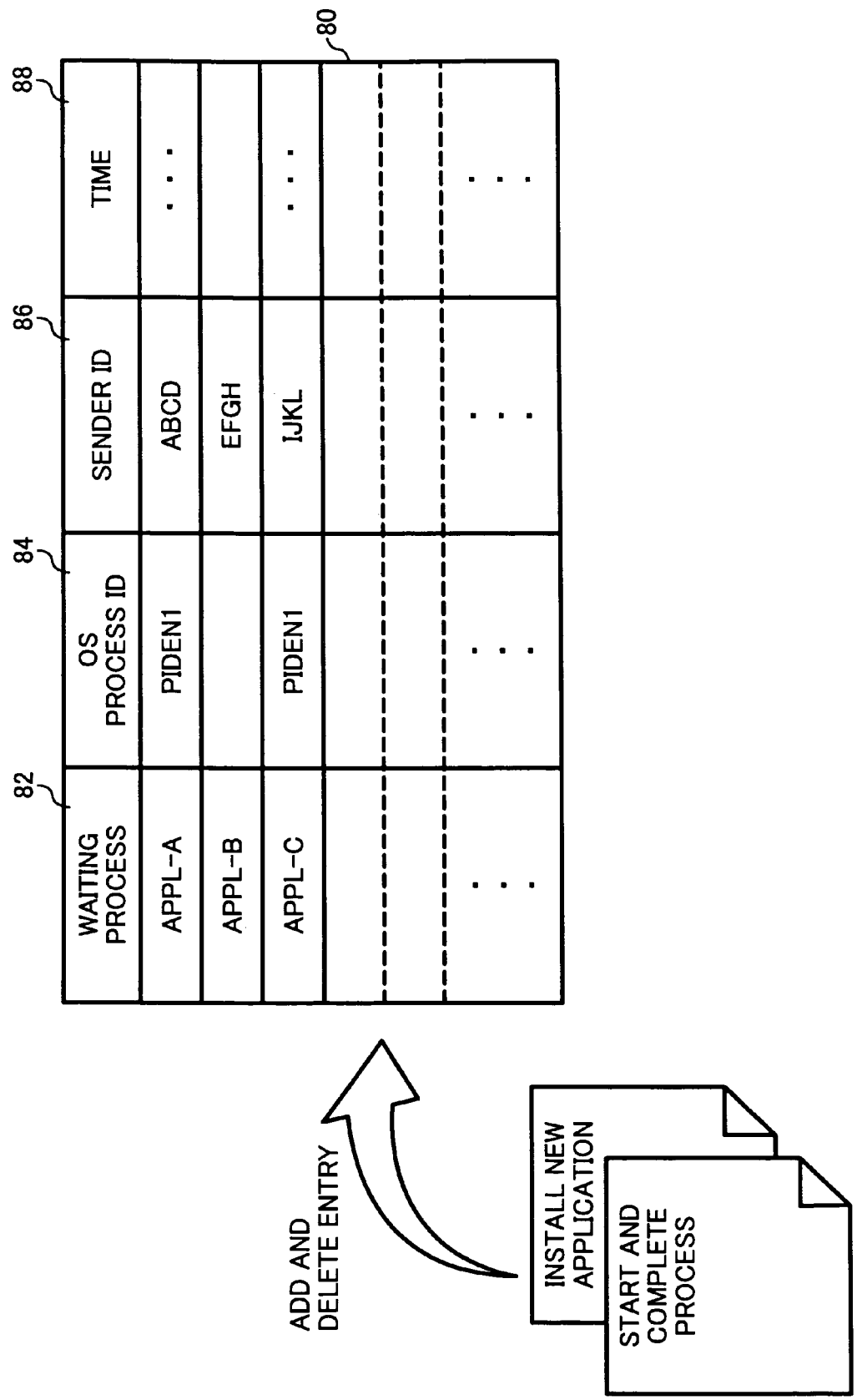
FIG. 11 illustrates another entry table of a destination-message storage in the software configuration shown in FIG. 4.

FIG. 11 illustrates an entry table 80 of the destination-message storage 52 shown in FIG. 4 according to another example. As illustrated in FIG. 11, the entry table 80 includes fields 82, 84, 86, and 88. The field 82 contains the application process waiting for an operating system message (i.e., the waiting process). The field 84 contains the OS process ID requested by the waiting process. The field 86 contains the sender identification information. The field 88 contains time at which the operating system message is requested, which may be used to set a priority on a time basis. An entry is added to the entry table 80 when a new application is installed or started. An entry is deleted from the entry table 80 when the application is uninstalled or ends.

In the entry table 80, whether an application process waits for an operating system message may be determined by checking whether the field 88 is null. When the field 88 is not null, that is, when the waiting process exists, time at which the operating system message is requested from the waiting process is obtained. When the entry controller 50 receives a request message for searching or retrieving from the message monitor 48, the entry controller 50 looks up the field 84 to determine whether an application process waits for a corresponding operating system message. When a plurality of application processes is entered, the entry controller 50 performs message conversion on the waiting processes in an order from the entry having the earlier time. The entry controller 50 buffers and encapsulates the processing result when processing is completed for the waiting application process to send the encapsulated information to the message monitor 48.

Figure 12:
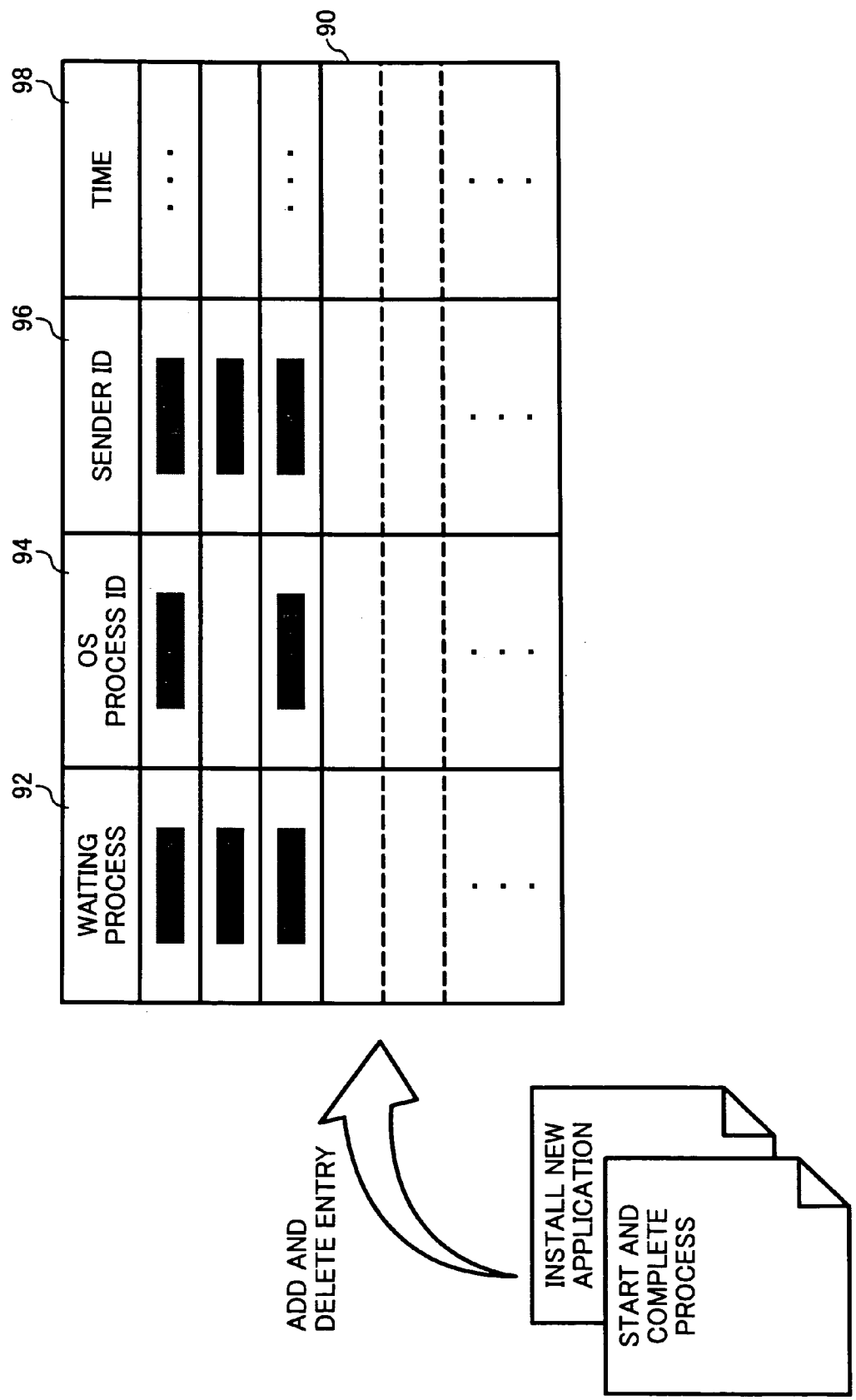
FIG. 12 illustrates yet another entry table of a destination-message storage in the software configuration shown in FIG. 4.

FIG. 12 illustrates yet another example of entry table 90 of the destination-message storage 52 shown in FIG. 4. As illustrated in FIG. 12, the entry table 90 includes fields 92, 94, 96, and 98. The field 92 contains an application process waiting for an operating system message (i.e., a waiting process). The field 94 contains the OS process ID requested by the waiting process. The field 96 contains a sender identification information. The field 98 contains time at which the operating system message is requested to set a priority on a time basis. An entry is added to and deleted from the entry table 90. The entry controller 50 encodes data in the fields 92, 94, and 96 by using an encryption key before registering the data. Therefore, the registered data is not accessed unless decoding is performed on the registered data. Data in the field 98 may also be encoded. However, the data in the field 98 may be registered without being encoded because an unauthorized access may not affect the data in the field 98 as much as the data in the fields 92, 94, and 96.

The data in the entry table 90 may be encoded using a public key cryptography or a symmetric key cryptography. The encryption algorithm may include a block cipher, a stream cipher, an RSA (Rivest, Shamit, Adleman) cryptosystem, a discrete logarithm, and an elliptic curve cryrptosystem. To increase the processing speed, the symmetric key cryptography may be used speeding this example. The message monitor 48 may send data encoded with the symmetric key cryptography and the entry controller 50 may decode the received data using the symmetric key cryptography.

To provide more strict security, the data in the entry table 90 may be encoded using the public key cryptography based on the encryption algorithm, such as the RSA cryptosystem. Alternatively, an electronic signature protocol may be used. For example, the message monitor 48 sends data and its hash value. The entry controller 50 decodes the received data with a secret key to generate a new hash value. The received hash value and the newly generated hash value are compared to determine whether the data has been altered or identify a sender of the data.

Figure 13:
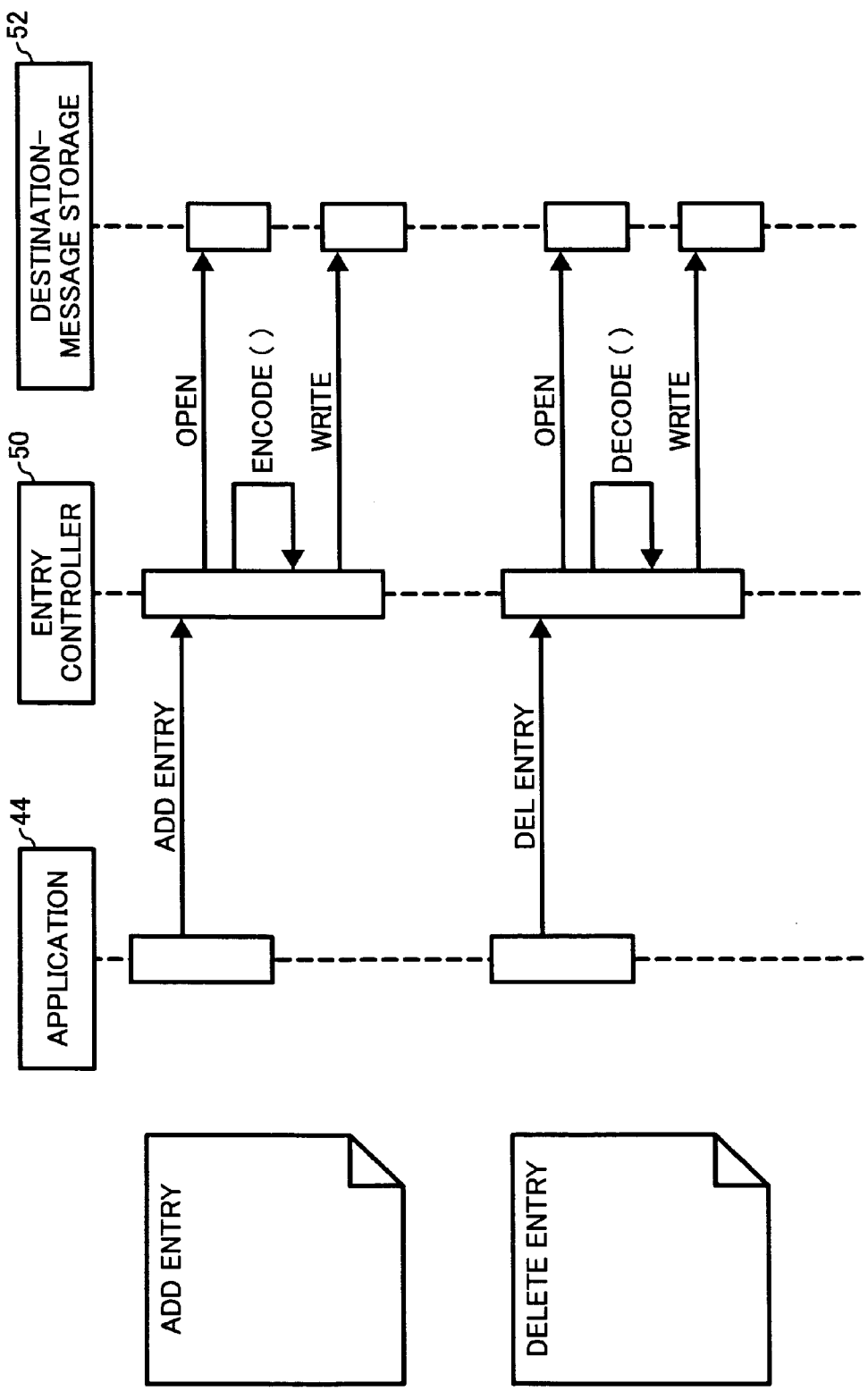
FIG. 13 illustrates processing for adding and deleting an entry to and from the entry tables shown in FIGS. 10 to 12.

FIG. 13 illustrates processing for adding or deleting an entry to or from the entry table based on the UML. The entry controller 50 may use encoding or decoding processing as described above to add or delete an entry to or from the entry table.

To add an entry, an application 44 (i.e., a destination) requests the entry table to be entered, for example, by sending t an "addentry" message to the entry controller 50. The entry controller 50 receives the "addentry" message and generates an instance of an "addentry ( )" object including a list class member function for adding the entry to a queue or a list, for example. The entry controller 50 sends an "open" message for opening a file to the destination-message storage 52. The destination-message storage 52 opens the file, performs reading processing on the number of entries, and performs encoding processing. When the encoding processing is finished, the destination-message storage 52 adds the encoded data in the entry table.

To delete an entry, the entry controller 50 receives a "delentry" message for deleting the entry from the application 44 and generates an instance of a "delentry ( )" object including a list class member function for deleting the entry, for example. The entry controller 50 decodes data in the entry table and deletes the corresponding entry from the entry table.

Figure 14:
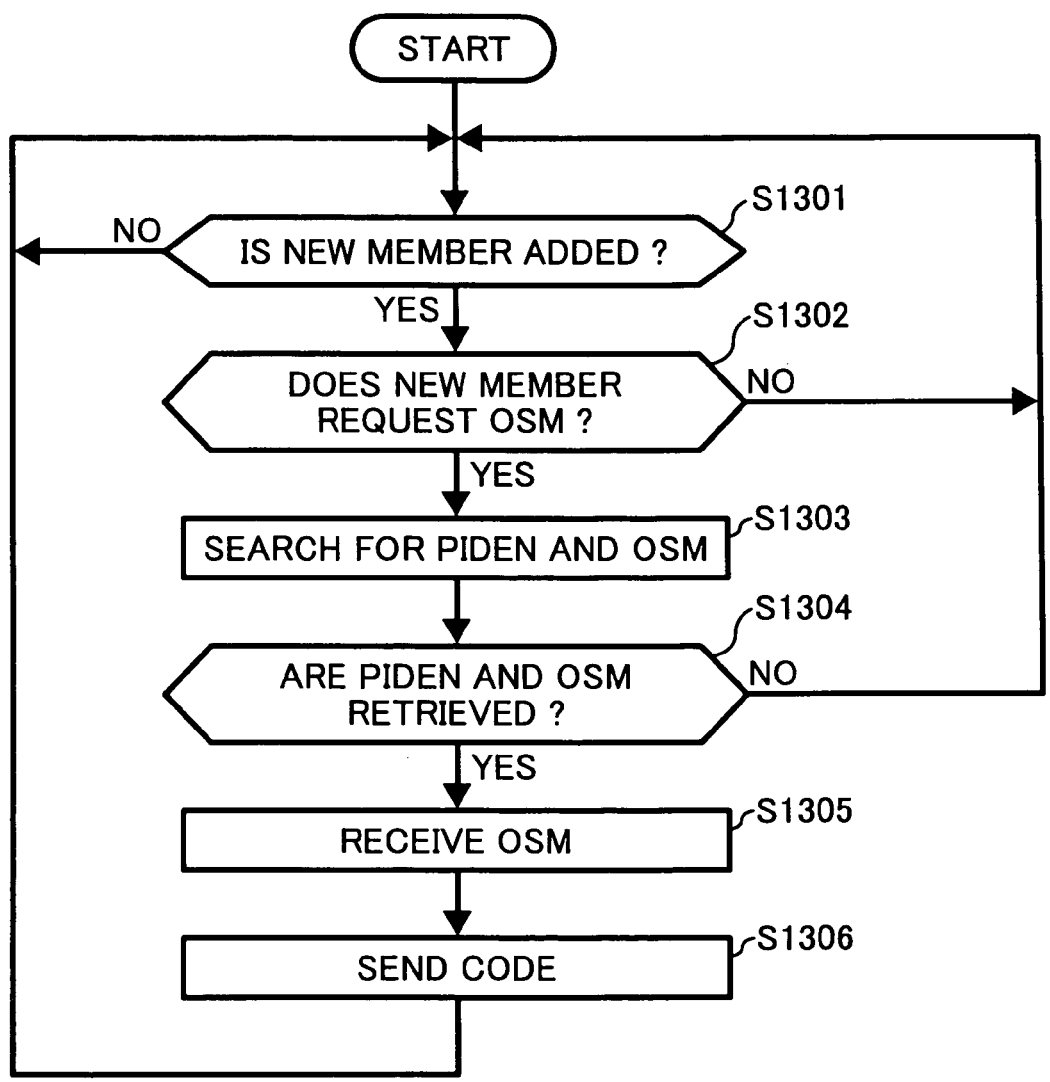
FIG. 14 is a flowchart illustrating another operations of an entry controller in the software configuration shown in FIG. 4.

FIG. 14 is a flowchart illustrating another example operation of the entry controller 50. The entry controller 50 of the message handler 46 monitors a request from an application for requesting an operating system message. The entry controller 50 receives the operating system message request and issues an inquiry to the message monitor 48. The operation of the entry controller 50 shown in FIG. 14 may be performed when the information processing apparatus 10 functions as a client or a web client, and is connected to the network including the LAN, the WAN, or the Internet.

As illustrated in FIG. 14, the entry controller 50 determines whether a new member is added in step S1301. For example, the entry controller 50 may determine using data or a latest access history of the entry table or by checking whether the entry controller 50 receives an operating system message request from an application. If the entry controller 50 determines that the new member is not added in step S1301 (i.e., if "NO" is selected in step S1301), the entry controller 50 repeats step S1301.

If the entry controller 50 determines that the new member is added in step S1301 (i.e., if "YES" is selected in step S1301), the entry controller 50 determines whether the new member requests an operating system message in step S1302. If the entry controller 50 determines that the new member does not request the operating system message in step S1302 (i.e., if "NO" is selected in step S1302), the entry controller 50 repeats step S1301. When the entry controller 50 manages the application requesting an operating system message as illustrated in FIG. 10, step S1302 may not be performed.

If the entry controller 50 determines that the new member requests the operating system message in step S1302 (i.e., if "YES" is selected in step S1302) or if the entry controller 50 is configured to regard addition to the entry table as the operating system message request, the entry controller 50 searches for the OS process ID "Piden" managed by the message monitor 48 and the operating system message corresponding to the "Piden" in step S1303.

In step S1304, the entry controller 50 determines whether the search result of step S1303 indicates that the entry table includes the entry. If the search result indicates that the entry table does not include the entry (i.e., if "NO" is selected in step S1304), the entry controller 50 repeats step S1301. If the search result indicates that the entry table includes the entry (i.e., if "YES" is selected in step S1304), the entry controller 50 issues a request for asking the message monitor 48 to send a corresponding operating system message and receives the operating system message in step S1305. Alternatively, the entry controller 50 converts the operating system message sent together with the search result into a code executable by a waiting application by looking up the conversion table in step S1305. In step S1306, the entry controller 50 sends the code to the address of the application. The entry controller 50 may perform encoding and decoding processing.

In step S1306, when the entry controller 50 is incorporated in an information processing apparatus or a web server connected to the network, the entry controller 50 may send the code executable by the application (i.e., "applm") via the protocol, such as the TCP/IP, by using the destination IP address and the remote port number. When the information processing apparatus is used in a client-server system connected to the network including the LAN, the executable code "applm" may be issued by using the TCP/IP, the UDP/IP, or other protocol including a NETBEUI (NetBIOS Extended User Interface).

Figure 15:
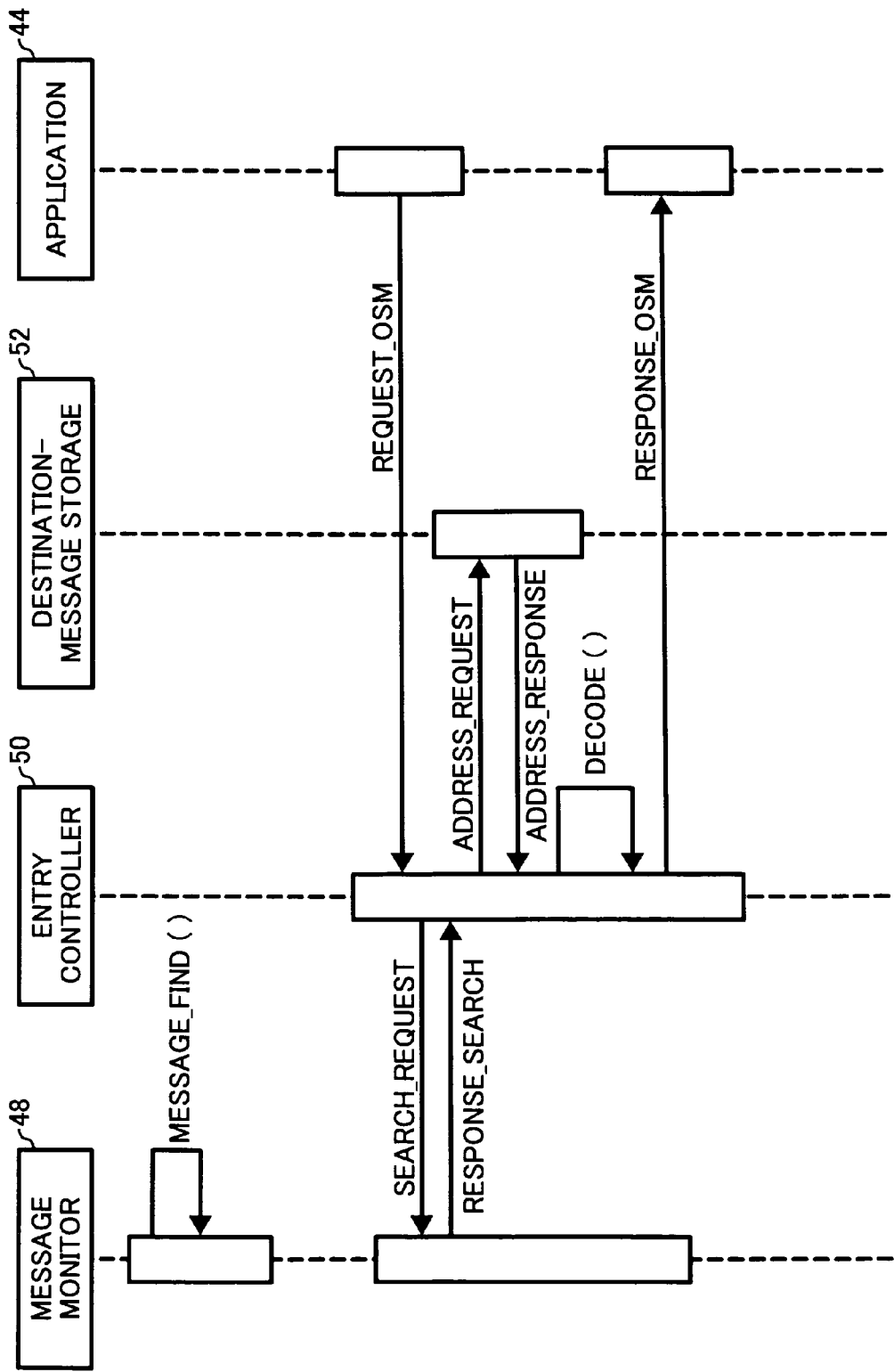
FIG. 15 illustrates processing for performing the operations shown in FIG. 14.

FIG. 15 illustrates communications between objects for performing the operation shown in FIG. 14 based on the UML. The message monitor 48 starts an instance of the message monitor object in response to execution of the operating system 42 or a command input by the user to register an operating system message. An application (i.e., a destination) starts and sends a message for requesting the operating system message to the message handler 46, for example, a "request_osm (Piden)" having the OS process ID as an argument.

In the message handler 46, the entry controller 50 receives the message and generates an instance of the entry control object. The entry controller 50 performs encoding with a public key or a symmetric key and decoding with a secret key, and adds the application to the entry table managed by the destination-message storage 52. The instance of the entry control object sends "search_request (Piden)", that is, a message for requesting an operating system message corresponding to "Piden" to the message monitor 48. The instance of the entry control object receives "response_search (Piden, osm)", that is, a message notifying a result of search performed by the message monitor 48.

When the entry controller 50 receives "response_search (Piden, osm)", the entry controller 50 analyzes a response packet and performs decoding as needed. The entry controller 50 searches through the entry table to retrieve a code executable by the application (e.g., "response_osm (Piden, code)") from the conversion table, and sends the retrieved executable code to the destination application. The entry controller 50 deletes an entry corresponding to the destination application from the entry table. An instance of the application receives "response_osm (Piden, code)" and executes the corresponding code to perform processing corresponding to the operating system message. Then, the instance of the application ends.

Figure 16:
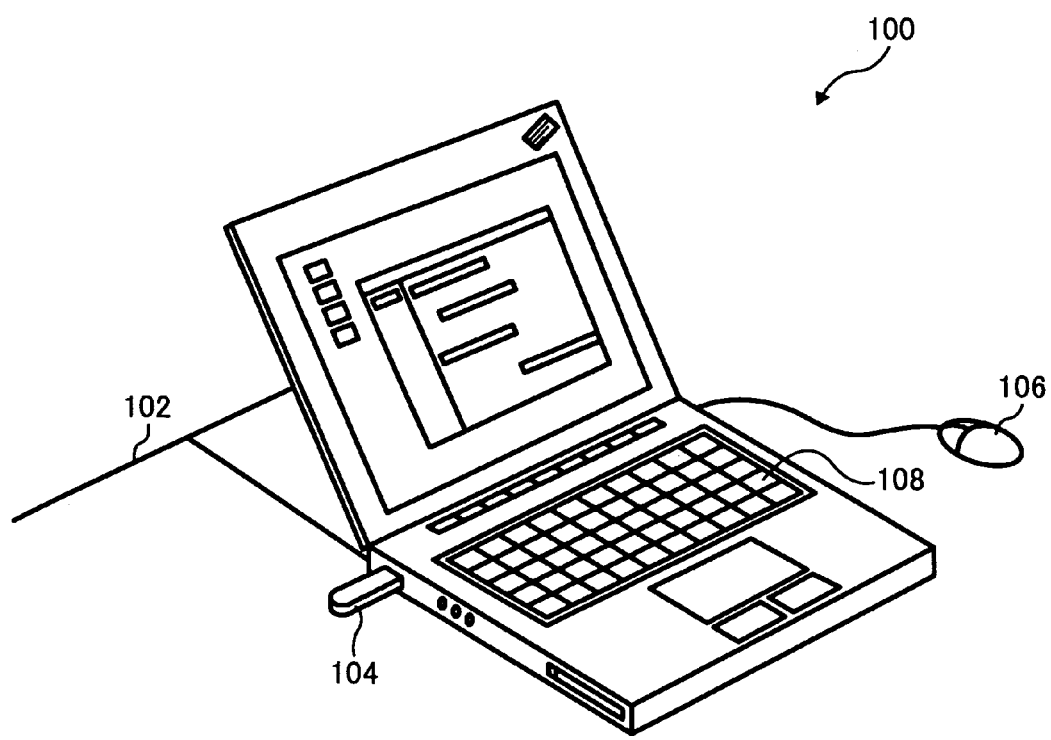
FIG. 16 illustrates an information processing apparatus including a message handler in the software configuration shown in FIG. 4 according to another exemplary embodiment of the present invention.

FIG. 16 illustrates an information processing apparatus 100 including the message handler 46 according to another exemplary embodiment of the present invention. As illustrated in FIG. 16, the information processing apparatus 100 includes a mouse 106 and a keyboard 108 and is connected to a network 102 and an external storage 104. The information processing apparatus 100 functions as a portable computer. The information processing apparatus 100 communicates with the network 102 including the LAN via Ethernet® to receive service from a client server or a web server.

The external storage 104 includes a semiconductor memory such as an EPROM (erasable programmable read-only memory), or a card-size HDD (hard disk drive) and is connected to the information processing apparatus 100 via a USB port, a PCI (peripheral component interconnect) bus, an AGP (accelerated graphics port) bus, or an ISA (Industry Standard Architecture) bus. The external storage 104 stores data in accordance with a command input by the user. The user inputs the command to the information processing apparatus 100 via the mouse 106 or the keyboard 108 to manage documents created with word-processing or database applications by using a document management application, for example.

The message handler 46 may be a module of a particular document management application or an independent application product, for example. In either case, the message handler 46 may be a service or daemon application which may start operating upon execution of the operating system 42. The message handler 46 may be started in accordance with a command input by the user. In this example, an icon for starting the message handler 46 may be displayed in a window on a display.

In this example, the document management application is installed in the information processing apparatus 100. Further, the word-processing and database applications are installed. Processes for the word-processing and database applications are managed by using a message sent from the operating system 42. The document management application communicates with the external storage 104 via a driver application. Input to and output from the document management application are managed via the BIOS and a device manager.

The document management application running on the information processing apparatus 100 is not capale of directly or automatically receiving a message issued by the operating system 42. Thus, whenever the message is issued, the message may be sent only to an addressed application, to which the message issued by the operating system 42 is addressed. For this reason, the document management application may continue waiting for a response from, for example, the word-processing application. Input to or output from the information processing apparatus 100 may be put hold by the document management application In this situation, valuable data created by the user may be deleted when the user resets the information processing apparatus 100. Even when the image forming apparatus 100 transmits or receives the data via the network, an HTTP (hypertext transfer protocol) response may not be sent from the apparatus 100 in response to a HTTP request. For example, when the stick type memory or the card-size HDD is removed while processing is performed, an operating system message indicating that the server does not respond or that the server is not connected may be generated by the operating system running on the information processing apparatus 100. However, the operating system message may not be automatically or directly sent to the document management application. Even when the document management application receives the operating system message, the document management application may not be able to execute the operating system message. As a result, the data may not be properly managed by the document management application.

To solve one or more of the above-described problems, the message handler 46 may monitor the operating system message and may send a code executable by the application, which corresponds to an operating system status, in accordance with requests which are made or may be made by any number of applications waiting for the operating system message. For example, such executable code may move data from a nonvolatile memory to automatically create a backup file. Thus, the information processing apparatus 100 may prevent the high-value-added data created by the user from being lost so as to improve work efficiency of the user.

FIG. 17 illustrates information processing apparatuses 100, 110, and 112 including the message handler 46 according to yet another exemplary embodiment of the present invention. As illustrated in FIG. 17, the information processing apparatuses 100, 110, and 112 are connected to a server 114 and a database 116 via the network 102. The network 102 includes the LAN, the WAN, or the Internet. The server 114 includes a client server and a web server. The database 116 stores documents. Each of the information processing apparatuses 100, 110, and 112 includes the message handler 46. For example, the message handler 46 is started in response to execution of the operating system 42 or a command input by the user to monitor an operating system message. Information regarding the operating system message may be obtained by an application, to which the operating system message is not addressed.

According to this non-limiting exemplary embodiment of the present invention, the sender identification information, may be obtained from a well-known port number or an executable file name provided by an operating system supplier. The address of the destination application may be selected from a registered port number or a dynamic private port number. Alternatively, a list or a function for associating the port number with the process name may be provided. For example, the entry table may store the process name and the application name in a corresponding manner, without requiring the port number.

The above-described functions according to the non-limiting exemplary embodiments of the present invention may be described in an object-oriented programming language, such as C++, Java®, Java® Beans, Java® Applet, Java® Script, or Servlet. The program according to the non-limiting exemplary embodiments of the present invention may be distributed via a flexible disk, a hard disk, a CD-ROM (compact disc read-only memory), a CD-RW (compact disc rewritable), an MO (magneto-optical), a DVD (digital versatile/video disc), a DVD-RW (digital versatile/video disc rewritable), a semiconductor memory, or a network as a transmission medium. The program may be installed into the information processing apparatus 10, 100, 110, or 112 to configure the functions according to the non-limiting exemplary embodiments of the present invention. The information processing apparatus 10, 100, 110, or 112 functions as a personal computer. However, the non-limiting exemplary embodiments of the present invention may be applied to information processing apparatuses suitable for image processing, which include a CPU (central processing unit) and are capable of the object-oriented programming. Such information processing apparatuses include a copying machine, a printer, and a multifunction printer using an electrophotographic method.

According to the non-limiting exemplary embodiments of the present invention, an operating system message may be shared among applications, which may be freely installed, uninstalled, started, or ended. This may prevent data from being lost due to restarting, thus improving usability or efficiency of the applications for data creation.

According to the non-limiting exemplary embodiments of the present invention, an operating system message may be shared by a newly installed application by updating conversion data without creating an API (application program interface).

According to the non-limiting exemplary embodiments of the present invention, efficiency or extensibility of interprocess communication may be improved.

According to the non-limiting exemplary embodiments of the present invention, the API does not have to be created for an unknown number of applications. Upon installing or starting a new application, a code executable by the new application is entered in the conversion table. This reduces workload in programming or application development.

This invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art. The present invention may also be implemented by the preparation of application specific integrated circuits or by interconnecting an appropriate network of conventional component circuits, as will be readily apparent to those skilled in the art.

The present invention has been described above with reference to specific exemplary embodiments. Note that the present invention is not limited to the details of the embodiments described above, but various modifications and enhancements are possible without departing from the spirit and scope of the invention. It is therefore to be understood that the present invention may be practiced otherwise than as specifically described herein. For example, elements and/or features of different illustrative exemplary embodiments may be combined with each other and/or substituted for each other within the scope of the present invention.

The present application is based on and claims priority to Japanese patent application No. 2005-191091 filed on Jun. 30, 2005 in the Japan Patent Office, the entire contents of which are hereby incorporated herein by reference.

What is claimed is:

1. An information processing system, comprising:
   a processor configured to execute a plurality of applications under control of an operating system, wherein the operating system is configured to communicate with the plurality of applications; and
   a storage device configured to store a plurality of instructions which, when executed by the processor, perform a plurality of functions including:
   monitoring a plurality of operating system messages generated by the operating system for the plurality of applications;
   storing, in a storage, an entry table that stores, for each of the plurality of operating system messages, an operation system process identifier for identifying an operating system process of the operating system that generates the operating system message, and a destination application identifier for identifying a destination application of the plurality of applications that has requested the operating system process to generate the operating system message;
   storing a conversion table that stores, for each of the plurality of operating system messages, the operating system process identifier, an operating system message status, and an application message including executable code executable by an application, in association with one another;

searching through the storage using a specific operating system process identifier obtained by the monitoring to obtain a destination application identifier associated with the specific operating system process identifier;

searching through the conversion table to obtain an application message associated with the specific operating system process identifier, wherein the obtained application message includes the executable code, which causes the destination application to perform a process; and causing the obtained application message, instead of the operating system message, to be sent to the destination application.

2. The information processing system of claim 1, wherein the destination application identifier identifies a specific process of the destination application that is waiting for the operating system message to be sent from the operating system process.

3. A message control method performed by a processor, the method comprising:

monitoring a plurality of operating system messages generated by the operating system for the plurality of applications;

storing, in a storage, an entry table that stores, for each of the plurality of operating system messages, an operation system process identifier for identifying an operating system process of the operating system that generates the operating system message, and a destination application identifier for identifying a destination application of the plurality of applications that has requested the operating system process to generate the operating system message;

storing a conversion table that stores, for each of the plurality of operating system messages, the operating system process identifier, an operating system message status, and an application message including executable code executable by an application, in association with one another;

searching through the storage using a specific operating system process identifier obtained by the monitoring to obtain a destination application identifier associated with the specific operating system process identifier;

searching through the conversion table to obtain an application message associated with the specific operating system process identifier, wherein the obtained application message includes the executable code, which causes the destination application to perform a process; and causing the obtained application message, instead of the operating system message, to be sent to the destination application.

4. The message control method of claim 3, wherein the destination application identifier identifies a specific process of the destination application that is waiting for the operating system message to be sent from the operating system process.

5. A non-transitory computer readable storage medium having recorded thereon a computer program which, when executed on a computer, causes the computer to perform a message control method comprising:

monitoring a plurality of operating system messages generated by the operating system for the plurality of applications;

storing, in a storage, an entry table that stores, for each of the plurality of operating system messages, an operation system process identifier for identifying an operating system process of the operating system that generates the operating system message, and a destination application identifier for identifying a destination application of the plurality of applications that has requested the operating system process to generate the operating system message;

storing a conversion table that stores, for each of the plurality of operating system messages, the operating system process identifier, an operating system message status, and an application message including executable code executable by an application, in association with one another;

searching through the storage using a specific operating system process identifier obtained by the monitoring to obtain a destination application identifier associated with the specific operating system process identifier;

searching through the conversion table to obtain an application message associated with the specific operating system process identifier, wherein the obtained application message includes the executable code, which causes the destination application to perform a process; and causing the obtained application message, instead of the operating system message, to be sent to the destination application.

6. The recording medium of claim 5, wherein the destination application identifier identifies a specific process of the destination application that is waiting for the operating system message to be sent from the operating system process.

* * * * *